(12) United States Patent
Camali (10) Patent No.: US 12,292,155 B2
(45) Date of Patent: *May 6, 2025

(54) SYSTEM AND METHOD OF LINER STORAGE AND TRANSPORT

(71) Applicant: INA Acquisition Corp., Wilmington, DE (US)

(72) Inventor: Eugene James Camali, Belleair Shore, FL (US)

(73) Assignee: INA Acquisition Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,231

(22) Filed: Feb. 21, 2024

(65) Prior Publication Data

US 2024/0191825 A1    Jun. 13, 2024

Related U.S. Application Data

(63) Continuation of application No. 17/822,610, filed on Aug. 26, 2022, now Pat. No. 11,933,447.

(60) Provisional application No. 63/237,869, filed on Aug. 27, 2021.

(51) Int. Cl.
*F16L 55/18*     (2006.01)
*F16L 55/165*    (2006.01)
*B60P 3/20*      (2006.01)

(52) U.S. Cl.
CPC .............. *F16L 55/18* (2013.01); *F16L 55/165* (2013.01); *B60P 3/20* (2013.01)

(58) Field of Classification Search
CPC ..... F16L 55/18; F16L 55/165; F16L 55/1651; B60P 3/20
USPC ....................................... 138/98, 97; 156/423
See application file for complete search history.

(56) References Cited

U.S. PATENT DOCUMENTS

| | | | |
|---|---|---|---|
| 4,685,983 | A | 8/1987 | Long, Jr. |
| 6,427,726 | B1 | 8/2002 | Kiest, Jr. |
| 6,478,054 | B1 | 11/2002 | Kiest |
| 9,534,726 | B1 | 1/2017 | Strom |
| 9,695,689 | B2 | 7/2017 | Pleasants et al. |
| 2006/0090804 | A1 | 5/2006 | Driver et al. |
| 2007/0001330 | A1 | 1/2007 | Driver et al. |
| 2021/0372555 | A1 | 12/2021 | Strom |

*Primary Examiner* — Patrick F Brinson
(74) *Attorney, Agent, or Firm* — Stinson LLP (57) ABSTRACT

A system for transporting and installing a cured-in-place-pipe (CIPP) liner to line existing pipe includes a chassis, a bed supported by the chassis and wheels mounted on the chassis for supporting the chassis as it is moved over the road. A container supported by the chassis has a first compartment and a second compartment. A refrigeration system supported by the chassis is operable to keep the first compartment cooled to a temperature at which resin carried within the liner does not prematurely cure. The second compartment contains a powered feeder that can pull liner from the first compartment through a port and feed it out of the container for installation. A method is also disclosed.

20 Claims, 8 Drawing Sheets

SYSTEM AND METHOD OF LINER STORAGE AND TRANSPORT

RELATED CASES

This application is a continuation of U.S. Nonprovisional patent application Ser. No. 17/822,610, filed Aug. 26, 2022, which claims priority to U.S. Provisional Patent Application Ser. No. 63/237,869, filed Aug. 27, 2021, which are hereby incorporated by reference in their entireties for all purposes.

FIELD

The present disclosure generally relates to methods, systems, and apparatus for use in rehabilitating main pipes using cured in place pipe (CIPP).

BACKGROUND

The use of linings to repair pipes is a well-known process that has many benefits, including relatively low cost and minimal disruption to surroundings. Although curable resin can be applied to a flexible felt liner at the job site, it is common for the resin to be applied at a remote location and shipped to the job site. Transport occurs in a truck that is refrigerated to avoid triggering premature curing of the resin prior to its installation in the pipe to be repaired. Other equipment is required for installation, such as equipment to feed the resin-ladened liner into the pipe, equipment for promoting curing of the resin in the liner once it is installed and equipment for inspecting and/or cutting the applied liner to re-establish lateral connections after lining. This equipment arrives at the job site in one or more trucks in addition to the truck that delivers the resin impregnated liners. Usually there are different laborers who handle at least some of the different types of equipment.

SUMMARY

In one aspect, a system for transporting and delivering cured-in-place-pipe (CIPP) liner to line existing pipe generally comprises a chassis, a bed supported by the chassis and wheels mounted on the chassis and arranged to support the chassis during transport. A container supported by the chassis and covering at least a portion of the bed comprises a first compartment sized and shaped for receiving and holding the CIPP liner carrying curable resin within the liner. The container also includes a second compartment adjacent to the first compartment. A port connecting the first and second compartments within the container is sized and shaped for receiving the CIPP liner through the port from the first compartment into the second compartment. A refrigeration system supported by the chassis is configured to cool the first compartment to temperatures that retard curing of the curable resin carried by the CIPP liner stored in the first compartment. A powered feeder in the second compartment arranged to engage the CIPP liner entering the second compartment through the port to draw the CIPP liner from the first compartment and to feed out the CIPP liner for installation into the existing pipe.

In another aspect, a method of rehabilitating a pipe generally comprises transporting a liner carrying a curable resin in an uncured state in a refrigerated compartment of a vehicle to a job site for installation of the liner into the pipe in need of rehabilitation. The liner is fed out from the refrigerated compartment for installation into the pipe using a powered feeder mounted on the vehicle.

Other aspects and features will also be understood from the following disclosure.

BRIEF DESCRIPTION OF THE DRAWINGS

Corresponding parts indicate corresponding reference characters throughout the drawings.

DETAILED DESCRIPTION

Figure 1:
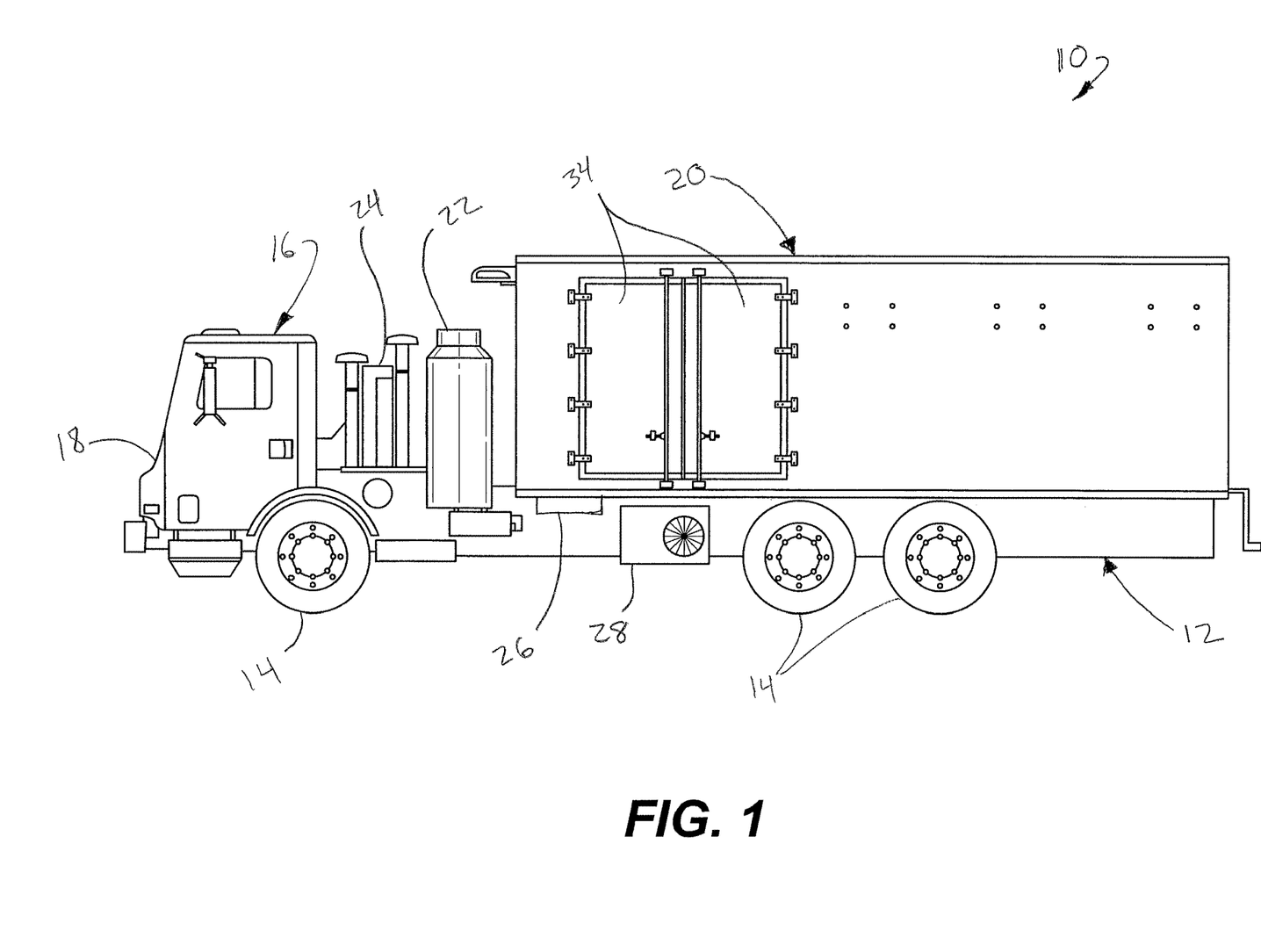
FIG. 1 is a right side elevation of a truck made according to the principles of the present invention.

Referring now to the drawings, a vehicle (specifically, a truck) for transporting and delivering cure-in-place-pipe liner for use in rehabilitating an existing pipe is indicated generally at 10. The truck includes a chassis 12 and wheels 14 mounted on the chassis that support the chassis. The truck 10 further includes a cab 16 in which a driver sits for guiding the transportation of the truck from a facility in which one or more liners are impregnated with a curable resin (sometimes referred to as "wet-out" of the liner), to a job site where one or more of the wetted out liners is used to line the interior of a pipe (not shown). The pipe for carrying a fluid can be, for example and without limitation, a sewer or wastewater pipe and a water pipe. An internal combustion engine 18 (e.g., diesel engine) in the cab 16 provides power to at least some of the wheels 14 for moving the truck 10 over the road, but also can be used to power other equipment for installing the liner. The chassis 12 also supports a container 20 or box that contains the wetted out liners and equipment for installing the liners, as will be described more fully hereinafter. The chassis 12 also supports a boiler 22 used to provide hot water or steam to promote curing of the curable resin after the liner is installed, a generator 24 for providing electrical power and a compressor 26 that produces compressed air for inflating a liner installed in the pipe. A vapor compression refrigeration unit 28 is also attached to the chassis 12. Although the components of the illustrated embodiment are shown on a single truck (broadly, a "system"), the system may be entirely or partially carried by a trailer separable from a cab (not shown).

Figure 2:
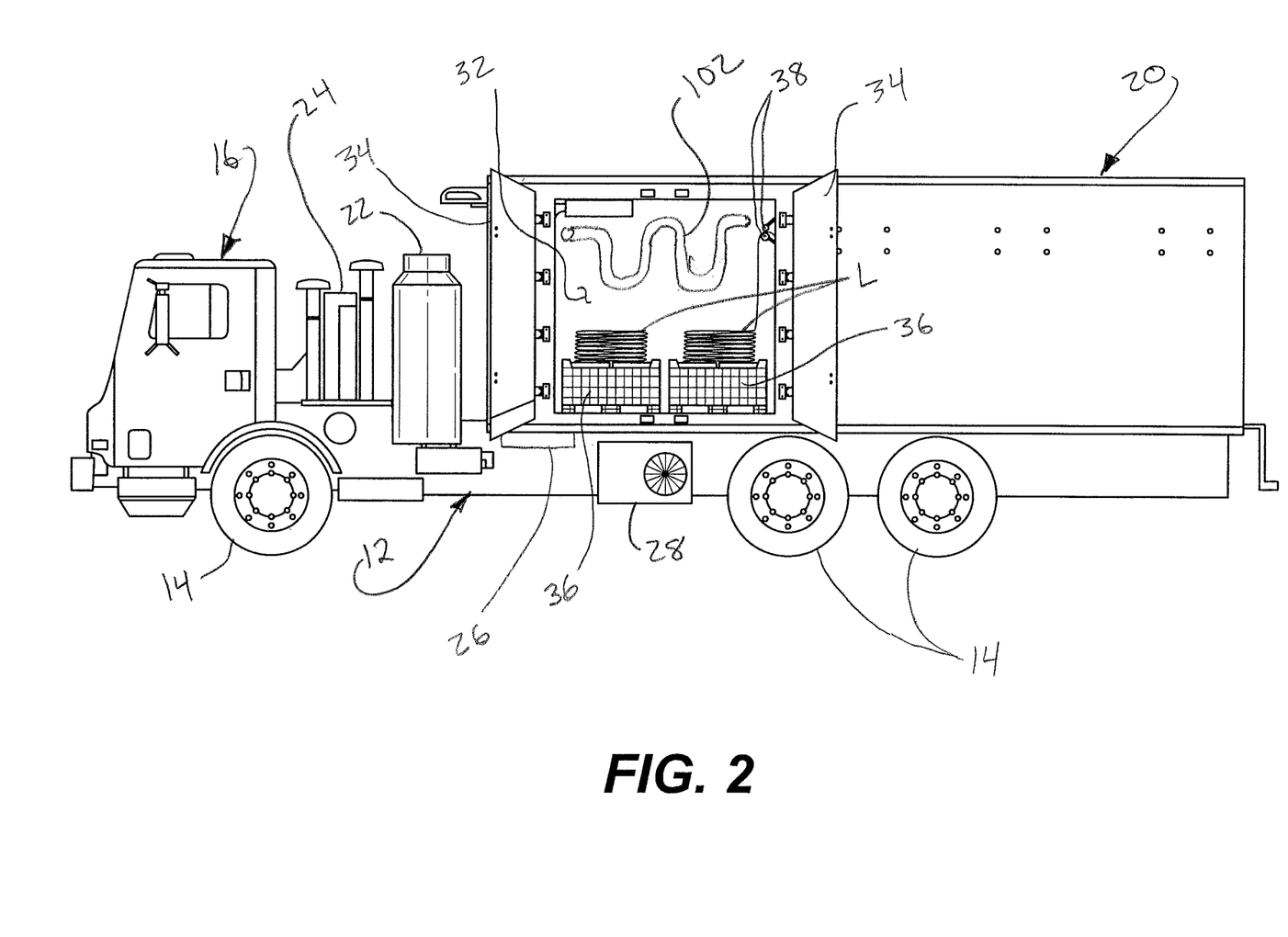
FIG. 2 is the right side elevation of FIG. 1, but with doors of the truck opened to show an internal refrigerated compartment.

As shown in FIG. 2, the container 20 defines a first, refrigerated compartment 32 and has doors 34 (shown open in FIG. 2) that permit access to the refrigerated compartment. Doors (not shown) could be provided on the other side of the refrigerated compartment 32 to allow access to the compartment from both sides. The refrigeration unit 28 is connected in a known manner to the refrigerated compartment 32 (e.g., connected to one or more evaporators in the compartment) for removing heat from the compartment. The refrigerated compartment 32 includes tables 36 that hold liners L (two liners may be seen in FIG. 2). The tables 36 hold the liners L apart from each other and off the floor of the refrigerated compartment 32 to minimize conductive heat transfer through the floor. The container 20 around the refrigerated compartment 32 is insulated to facilitate the refrigeration unit maintaining the temperature in the compartment below a level that would initiate curing of the resin in the liners L. Idler rollers 38 mounted on a rearward wall of the refrigerated compartment 32 transition motion of the liner L being installed from a substantially vertical direction to a substantially horizontal direction. The refrigerated compartment 32 includes a port 40 (shown and described more fully below in relation to FIG. 6) proximate the rollers 38 allowing the liner L to pass out of the refrigerated compartment.

The container 20 further defines a second, unrefrigerated compartment 44 located just to the rear of the refrigerated compartment 32. The unrefrigerated compartment may be seen in FIG. 3, where rear doors 46 of the container 20 are shown opened. The unrefrigerated compartment 44 can house a number of items required for installing the liner L into the pipe. Among these is a powered roller 48 that is driven by a hydraulic motor system 50 (broadly, an "engine") that is also supported by the chassis 12. It will be understood that other types of engines may be used within the scope of the present invention. As may be seen in FIG. 4, the powered roller 48 has a textured and gripping outer surface 52 that engages the liner L being fed out from the truck 10. The powered roller is supported by trunnions 54 rotatably mounted on the internal wall of the container 20. In addition to the powered roller 48, there are a pair of idler rollers 56 that help guide the liner L to the powered roller. The idler rollers 56 are also mounted by trunnions 58 on opposite internal walls of the container 20. In addition, a drip pan 60 is provided to catch ice or other material dripping off of the liner L. Although two compartments 34, 44 are shown in the illustrated embodiment, there may be other numbers of compartments. Moreover, the arrangement of the compartments can be other than described, for example, a refrigerated compartment could be located rearward of an unrefrigerated compartment.

Figure 5:
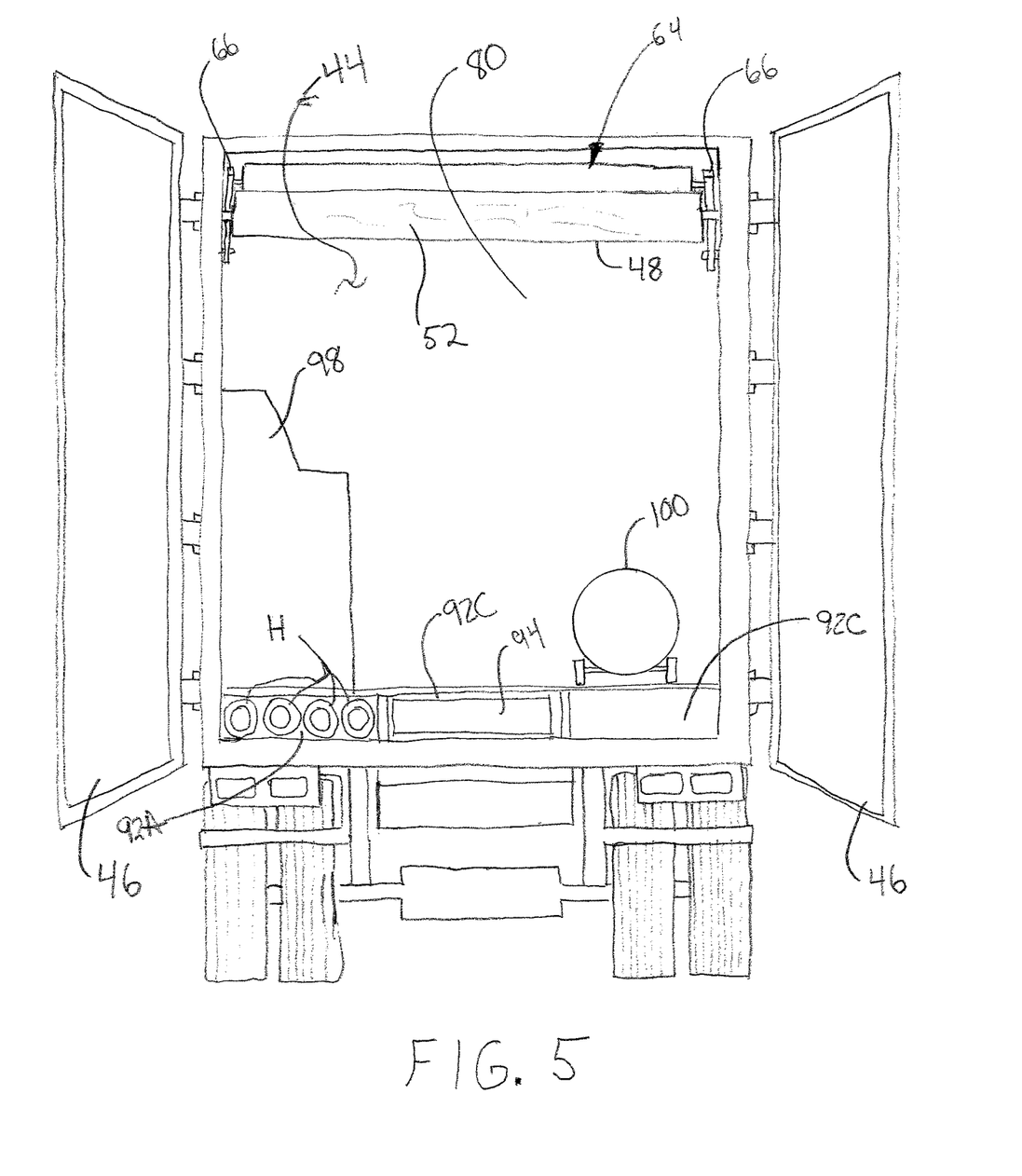
FIG. 5 is a rear elevation similar to FIG. 3, but showing another arrangement of the unrefrigerated compartment.
Figure 6:
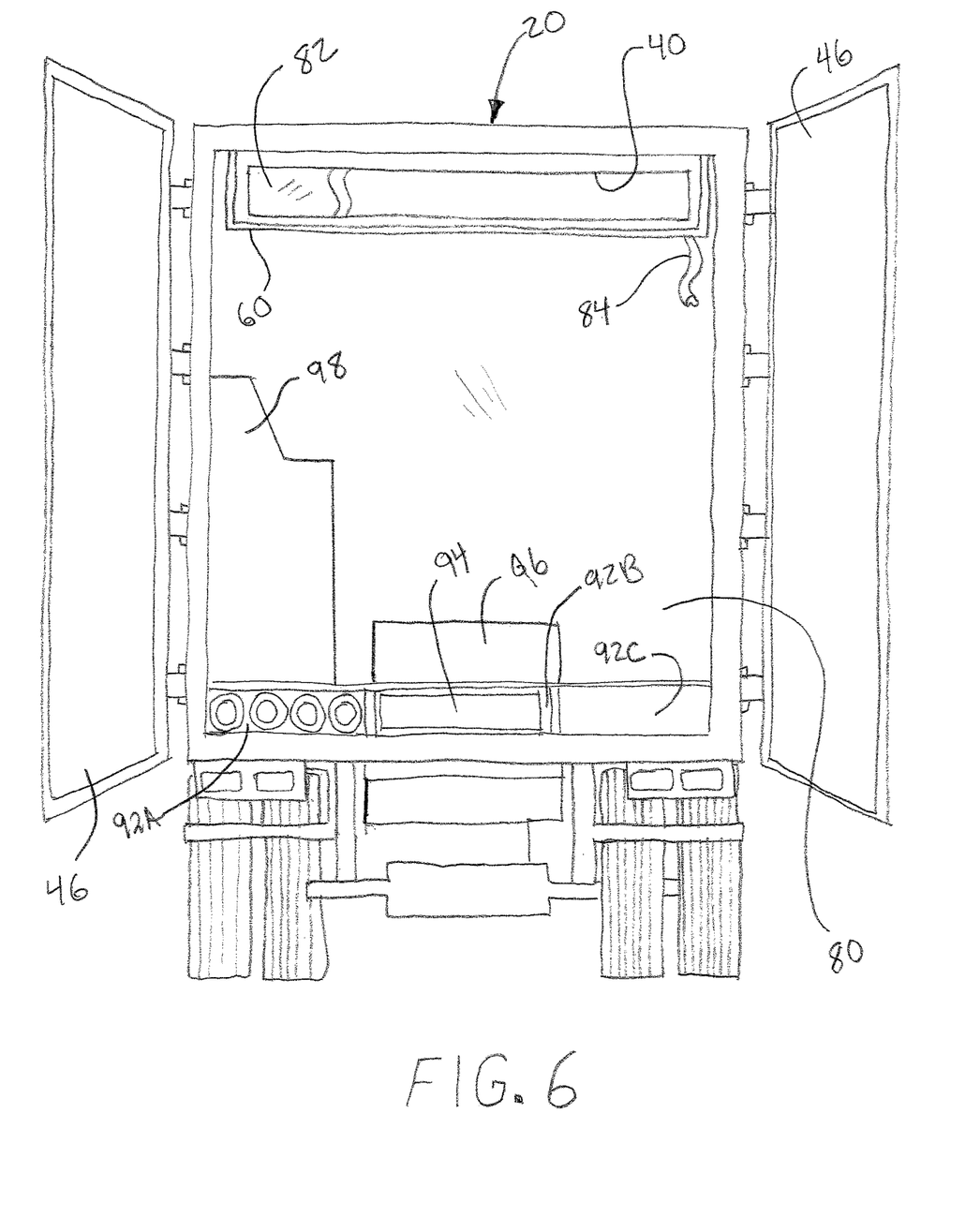
FIG. 6 is the rear elevation of FIG. 5, but rollers removed to reveal a port between the refrigerated compartment and the unrefrigerated compartment.
Figure 7:
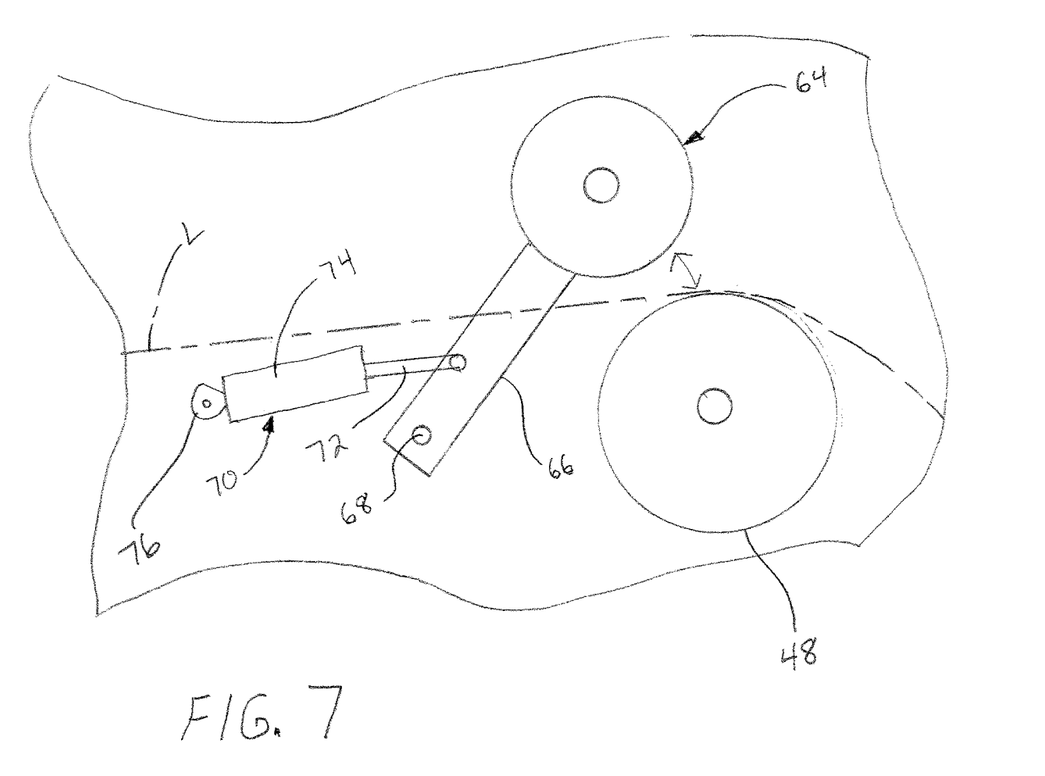
FIG. 7 is an enlarged, schematic side view of rollers in the unrefrigerated compartment.

FIGS. 5-7 illustrate a closely related but slightly modified version of the unrefrigerated compartment 44. More particularly, as best seen in FIG. 7, there is a pinch roller 64 that can be moved to pinch the liner L between the pinch roller and the powered roller 48. The force of the pinch roller 64 can provide a stronger grip of the liner L to more forcefully drive the liner out from the powered roller 48. The pinch roller 64 is mounted at each end on an arm 66 for rotation with respect to the arm. An opposite end of each arm 66 is mounted by a respective pivot pin 68 on one of the internal walls of the container 20 in the unrefrigerated compartment 44 for pivoting of the arm about the location where it is mounted. The pinch roller 64 may be pivoted by the arms 66 between an engaged position in close proximity to the powered roller 48 and a release position spaced farther from the powered roller. The powered roller 48 and/or the combination of the powered roller and the pinch roller 64 can be considered "a powered feeder" in the illustrated embodiment. The other idler rollers 38, 56 may also be considered part of the powered feeder. Pivoting movement of the pinch roller 64 is actuated by a cylinder 70 having a piston rod 72 pivotally mounted on one of the arms 66. A barrel 74 of the cylinder 70 has a flange 76 pivotally mounted on the wall of the container 20 in the unrefrigerated compartment 44.

FIG. 6 illustrates the unrefrigerated compartment 44 with the powered roller 48 and the pinch roller 64 removed so that the port 40 in a wall 80 of the container 20 separating the refrigerated compartment 32 from the unrefrigerated compartment can be seen. The port 40 allows the liner L in the refrigerated compartment 32 to pass into the unrefrigerated compartment 44 for engagement by the powered roller 48 (and pinch roller 64) to be fed out to the pipe in which the liner is to be installed. A shutter 82 can close the port 40 to thermally isolate the refrigerated compartment 32 from the unrefrigerated compartment when the liner L is not being fed out for installation. For example, the shutter 82 would be closed during transport of the liner L from a wet-out facility to the job site. In FIG. 6, only a fragmentary portion of the shutter 82 is shown, with the remainder broken away to reveal the port 40. The shutter 82 can be opened by pivoting upward and into the refrigerated compartment 32 on a hinge (not shown) adjacent the port 40 to fully open the port. The drip pan 60, also illustrated in FIG. 6, is shown to further include a drain hose 84 for delivering water to a location outside the unrefrigerated compartment 32, so that the unrefrigerated compartment may be kept dry. Additional rollers (not shown) may be provided at the back of the refrigerated compartment 32 to control the path of the liner L exiting the container 20.

Figure 3:
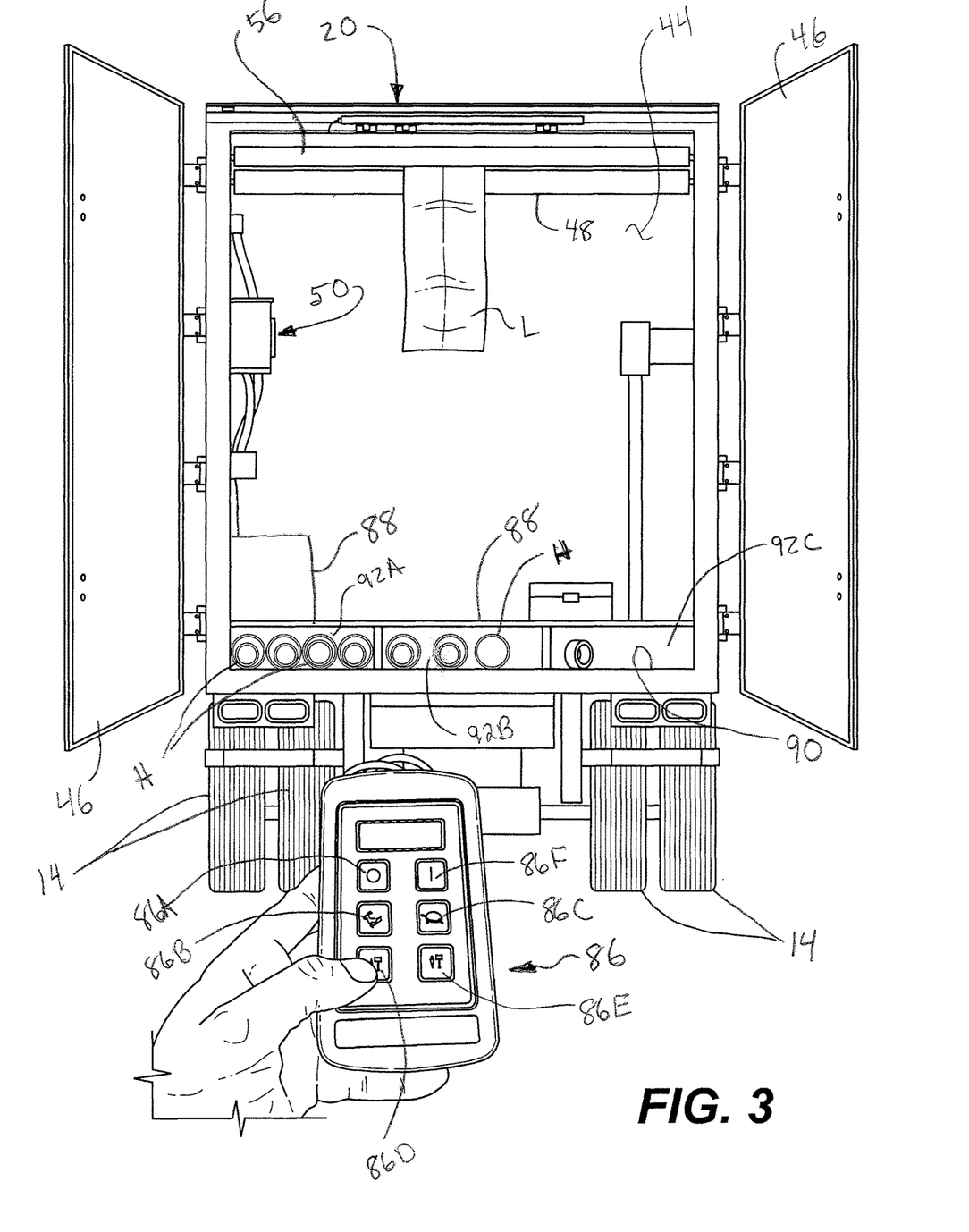
FIG. 3 is a rear elevation of the truck showing an unrefrigerated compartment and use of a remote controller.
Figure 4:
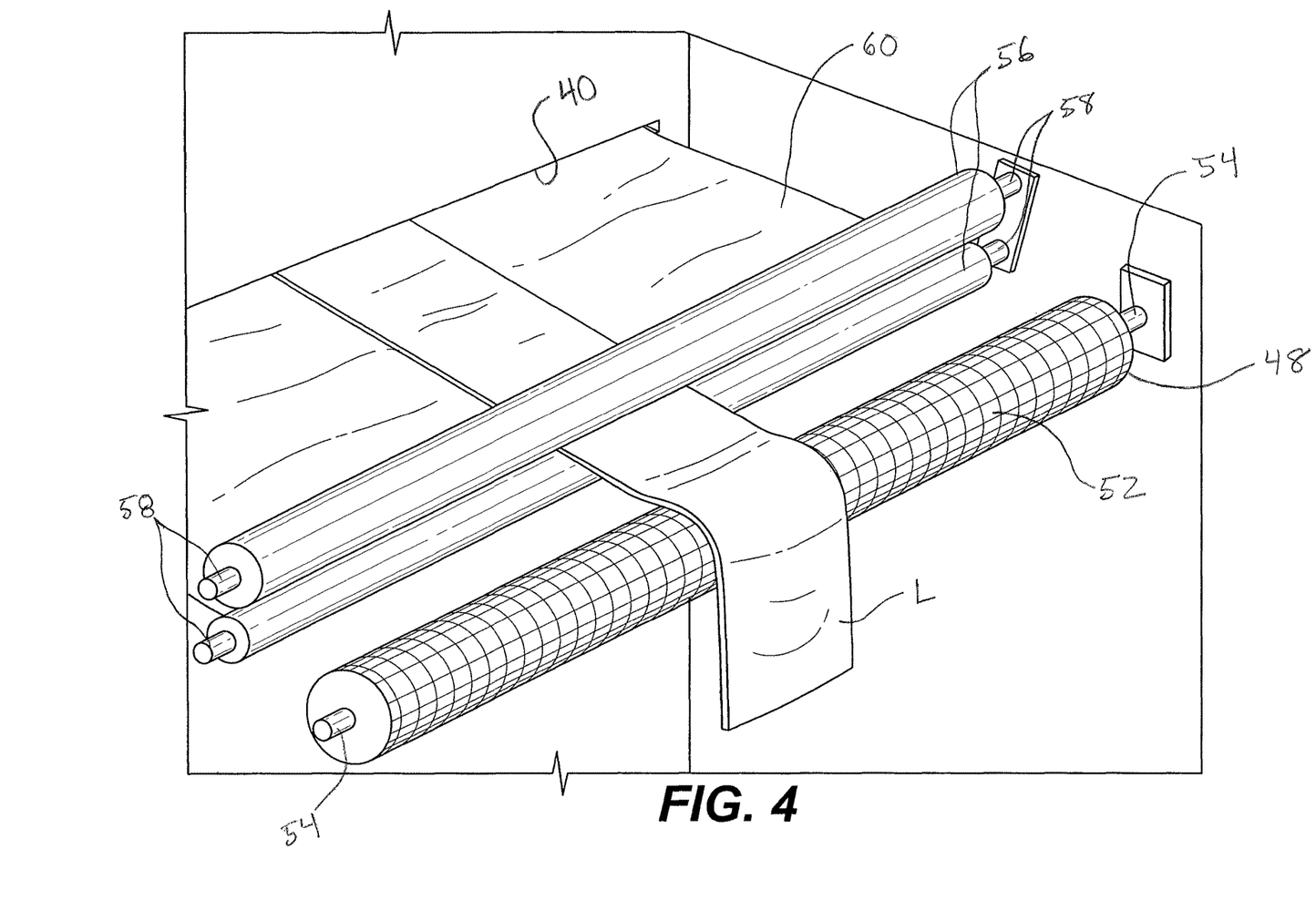
FIG. 4 is a schematic perspective of a fragment of the unrefrigerated compartment showing idler and drive rollers.

The powered roller 48 and the pinch roller 64 can be remotely controlled using a remote control 86 (e.g., a radio frequency remote control), such as is illustrated in FIG. 3. The remote control 86 can wirelessly or by wired connection communicate with a controller 88 on board the truck 10 to direct operation of the powered roller 48 and the pinch roller 64. It will be understood that other equipment could be controlled by the remote control 86. The remote control includes buttons that can be pressed to achieve certain actions. For example, a button 86A may cause the powered roller 44 to start turning. Other buttons can be pressed to increase (button 86B) or decrease (button 86C the speed at which the powered roller 48 turns. Still another button 86D can turn off the powered roller 48, to stop its rotation. There are also buttons 86E, 86F provided to move the pinch roller 64 between its engaged position and release positions. As a result, a worker off of and away from the truck 10 and the container 20 to handle the passage of the liner L into the pipe, can control how the liner is being fed out without having to go to the truck. This allows elimination of a separate worker who solely controls the feed out of the liner L. More generally, the truck 10 of the illustrated embodiment is believed to be capable of replacing two to three trucks at the job site with a single truck including all of the necessary equipment.

The unrefrigerated compartment 44 includes a floor 88 that is spaced above a bed 90 of the container 20 in the unrefrigerated compartment. In the illustrated embodiments, the floor 88 is about eight inches above the bed 90. In the embodiment of FIG. 3, the space between the floor 88 and the bed 90 is divided into three storage spaces 92A-92C. Equipment needed for installing the liner L into the pipe can be kept in the storage spaces 92A-92C for transport and while not being used. For example, hoses or piping H can be stored in the storage spaces 92A-92C, as shown in FIG. 3. In the embodiment of FIGS. 5 and 6, the center storage space 92B contains a tank 94. The tank can be used to store water for the boiler 22, or could be used to store diesel or other fuel to run equipment used to install the liner L. The floor 88 may include a hatch 96 (shown raised in FIG. 6) that permits access to the tank 94 for filling or connection to the tank. Suitable piping (not show) between the tank 94 and the boiler 22 is used to deliver water from the tank to the boiler when the tank is purposed for boiler supply. In one embodiment, the exhaust pipe from the internal combustion engine 18 of the truck 10 can be routed to be in thermal communication with the tank 94 for pre-heating water that is later supplied to the boiler 22.

The unrefrigerated compartment 44 includes ample space apart from the components (rollers, etc.) used to feed the liner L from the refrigerated compartment 32 to a location outside of the container 20. The space can be used for general storage. However, in the embodiment of FIGS. 5 and 6, the unrefrigerated compartment may include an inspection system comprising a console 98 and a robot 100 (shown only in FIG. 5). The console 98 may include a screen and controls for controlling the robot 100 as it moves down the pipe. The screen allows inspection of the pipe before and after it is lined. The robot 100 can move down the pipe and carries one or more cameras or other sensors for examination of the pipe and/or liner installed in the pipe. The same console 98 and robot 100 may also be part of a UV curing system. In that event the robot 100 would carry (or pull another component carrying) UV emitters.

Figure 8:
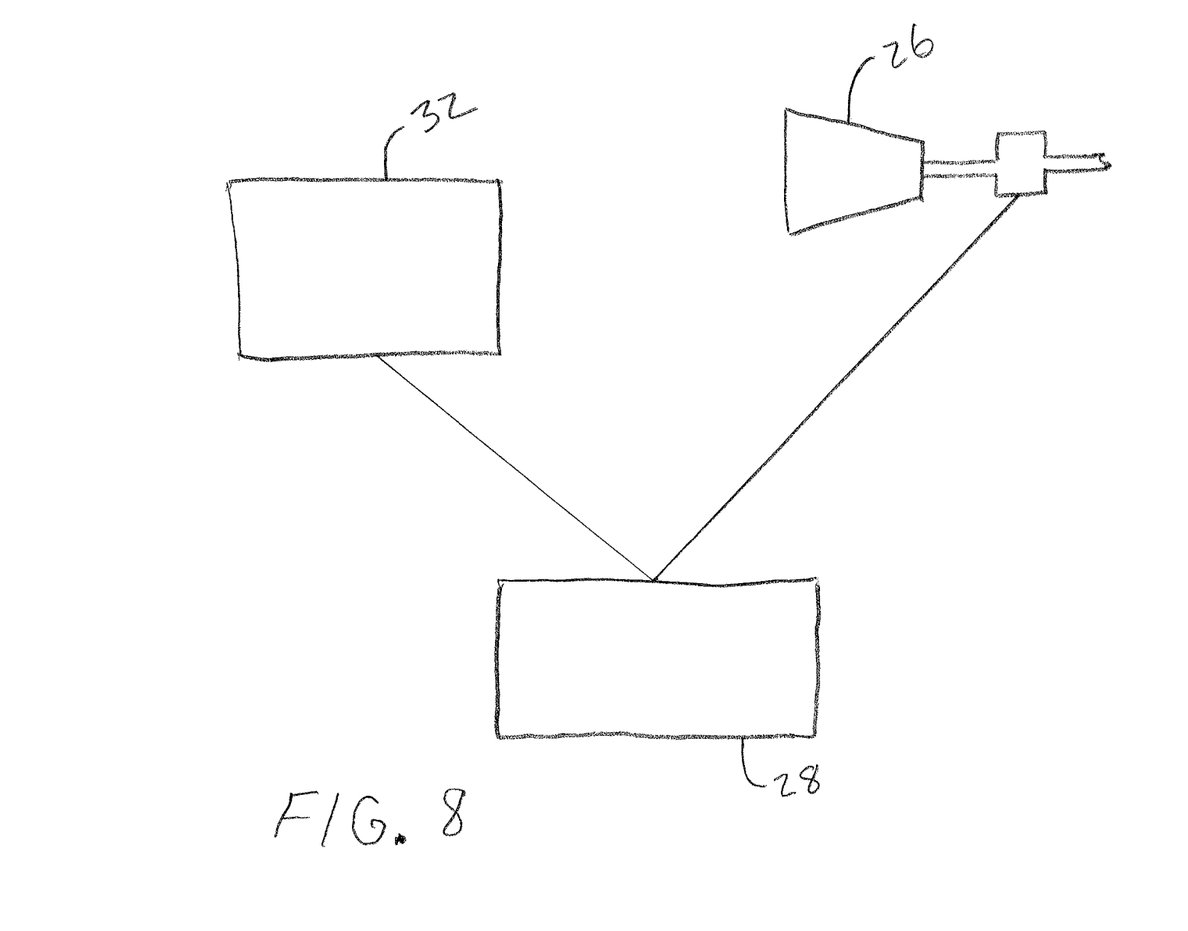
FIG. 8 is a diagrammatic view of a refrigeration system connected to the refrigerated compartment and also to the air supply for an installed CIPP liner.

The truck 10 can also be used to provide cooled air to the liner L after it is installed in the pipe. In some embodiments, the liner L is placed in the pipe in a flattened condition. In other embodiments, the liner L is installed by everting the liner into the pipe using air or water pressure. After liner placement is complete, high pressure air from the compressor 26 is supplied to the interior of the liner L to inflate the liner so that it generally conforms to the interior of the host pipe. However, air leaving the compressor 26 is at a very high temperature, which is not desirable for the liner. Desirably, the compressor 26 includes an after cooler to remove some of the heat of the air exiting the compressor. As schematically illustrated in FIG. 8, the same refrigeration unit 28 that is used to cool the refrigerated compartment 32 can be used to cool the air leaving the compressor 26 prior to its entry into the liner L. In one embodiment, this could be accomplished by providing a portion of a conduit 102 in the refrigerated compartment (see, FIG. 2). Air from the compressor 26 could be diverted to pass through the conduit portion 102 in the refrigerated compartment 32 to release heat that is ultimately removed by the refrigeration unit 28. Preferably, there would be another conduit portion (not shown) that does not pass through the refrigerated compartment 32 so that compressed air could be provided directly to the liner without passing through the refrigerated compartment. The conduit portion 102 passing through the refrigerated compartment could include fins or other increased surface area to improve heat transfer.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A system for transporting and delivering cured-in-place-pipe (CIPP) liner to line existing pipe, the system comprising:
   a chassis;
   a bed supported by the chassis;
   wheels mounted on the chassis and arranged to support the chassis during transport;
   a boiler supported by the chassis for supplying at least one of hot water and steam;
   a container supported by the chassis and covering at least a portion of the bed, the container sized and shaped for receiving and holding the CIPP liner carrying curable resin within the liner;
   a refrigeration system supported by the chassis and configured to cool the container to temperatures that retard curing of the curable resin carried by the CIPP liner stored in the container; and
   a powered feeder supported by the chassis and arranged to feed out the CIPP liner from the container for installation into the existing pipe.

2. The system as set forth in claim 1 further comprising a tank supported by the chassis and connectable to the boiler for supplying additional water to the boiler.

3. The system as set forth in claim 1 further comprising an engine supported by the chassis and configured to drive the feeder.

4. The system as set forth in claim 3 further comprising a controller supported by the chassis and configured to control operation of the engine to drive the feeder.

5. The system as set forth in claim 4 further comprising a remote control configured for communication with the controller from a location outside the container to direct the operation of the controller in controlling the engine whereby feeding of the CIPP liner from the container can be controlled from a location away from the feeder.

6. The system as set forth in claim 5 wherein the remote control is configured to communicate by radio frequency communication.

7. The system as set forth in claim 1 wherein the powered feeder comprises a feed roller configured to be driven in rotation by the engine.

8. The system as set forth in claim 7 further comprising idler rollers adjacent to the feed roller.

9. The system as set forth in claim 7 wherein the powered feeder further comprises a pinch roller configured for movement with respect to the feed roller to selectively pinch the CIPP liner between the pinch roller and the feed roller.

10. The system as set forth in claim 9 further comprising a controller supported by the chassis and configured to control movement of the pinch roller toward and away from the feed roller.

11. The system as set forth in claim 1 wherein the container is sized and shaped for simultaneously storing plural CIPP liners carrying curable resin.

12. The system as set forth in claim 1 wherein the container includes a floor above the bed, and a storage space under the floor.

13. The system as set forth in claim 12 further comprising a tank located under the floor.

14. The system as set forth in claim 1 further comprising an internal combustion engine mounted on the chassis and configured to drive at least some of the wheels for moving the chassis.

15. The system as set forth in claim 14 wherein the internal combustion engine includes an exhaust line in thermal communication with the tank for pre-heating water to be supplied to the boiler.

16. The system as set forth in claim 1 wherein the container includes thermal insulation arranged for maintaining the temperature of the container.

17. The system as set forth in claim 1 further comprising a drip pan positioned to catch ice falling from the CIPP liner as it moves to the powered feeder.

18. The system as set forth in claim 1 further comprising a compressor supported by the chassis for supplying air to the liner for inflating the liner, the compressor and the refrigeration system being operatively connected to each other for removal of heat from air from the compressor by the refrigeration system.

19. A method of rehabilitating a pipe comprising:
transporting a liner carrying a curable resin in an uncured state in a refrigerated compartment of a vehicle to a job site for installation of the liner into the pipe in need of rehabilitation, the refrigerated compartment including a top wall, a bottom wall and side walls extending vertically between the top and bottom walls;
transporting a boiler on the vehicle simultaneously with transporting the liner;
feeding out the liner from the refrigerated compartment through a side wall of the refrigerated compartment;
installing the liner fed out from the refrigerated compartment into the pipe;
supplying fluid from the boiler on the vehicle to cure the installed liner in the pipe.

20. The method as set forth in claim 19 further comprising supplying water to the boiler from a tank on the vehicle.

* * * * *